Feb. 13, 1940.  H. A. RHINEVAULT  2,190,585
C CLAMP.
Filed Aug. 22, 1936
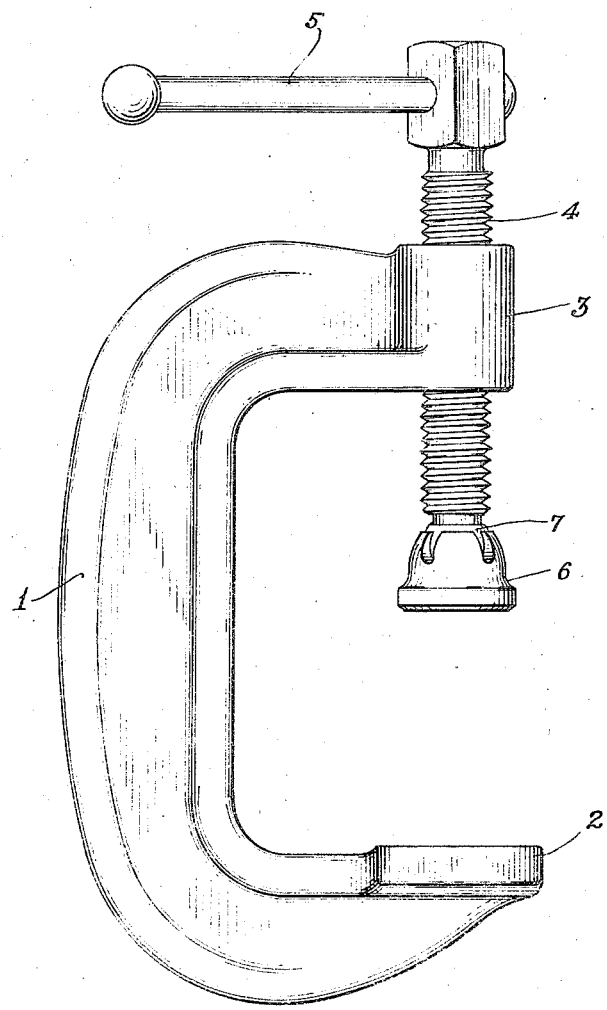
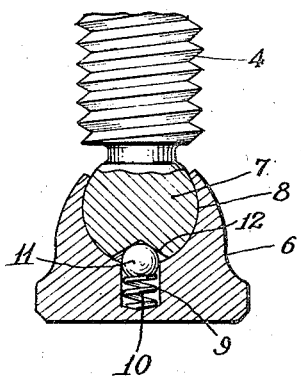
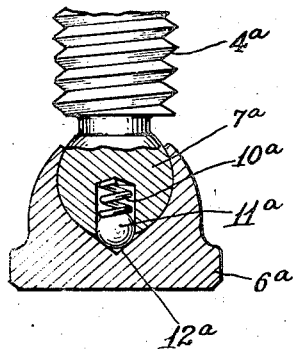
Inventor
H. A. Rhinevault
By
Parker Carlson Pitzner Hubbard
Attorneys.

Patented Feb. 13, 1940

2,190,585

UNITED STATES PATENT OFFICE 2,190,585

C CLAMP

Harry A. Rhinevault, Chicago, Ill., assignor to Armstrong Bros. Tool Co., Chicago, Ill., a corporation of Illinois Application August 22, 1936, Serial No. 97,351

1 Claim. (Cl. 144—304)

It is customary to provide the clamping screw of a C clamp with a cap having a ball-and-socket connection with the inner end of the screw so that the cap may adjust itself into proper contact with the part to be clamped. This construction, which has been in use for a great many years, gives rise to much inconvenience, especially when the clamp must occupy a horizontal or inclined position, because the cap may turn by gravity on its ball-and-socket joint so that it is out of position to bear properly against the piece to be clamped and it is necessary for the workman manually to hold the cap in alinement with the screw while clamping the piece. Inasmuch as it is usually necessary for him to support or position the piece to be clamped and the body or frame of the C clamp and turn the clamping screw, it will be seen it is awkward and inconvenient to perform all of these operations with two hands. Moreover, when the clamp is used in a horizontal position the cap may turn into such position that the pressure of the screw will force the cap off the screw.

The present invention relieves the operator of the necessity of manually positioning the screw cap in alinement with the screw, while leaving the cap free to adjust itself to any irregularities of the thing being clamped.

In the accompanying drawing:

Figure 1 is an elevation of a C clamp embodying the features of my invention.

Fig. 2 is a fragmental sectional view illustrating one form of construction for connecting the screw cap to the screw.

Fig. 3 is a similar view illustrating an alternative construction.

The C-shaped body or frame 1 of the clamp may be of any conventional or desired construction. 2 is the fixed clamping jaw on the frame 1. Opposite the jaw 2 the frame 1 is provided with a sleeve 3 which is screw-threaded to receive the clamping screw 4. The outer end of the clamping screw 4 is provided with any ordinary or preferred means for turning the screw, as, for example, the slidable handle bar 5.

A cap 6 has a ball-and-socket connection with the inner end of the clamping screw, the ball 7 being herein shown as formed upon the end of the screw and the cap being shown as having a socket 8 embracing the ball 7. As in prior constructions, the universal joint formed by the parts 7 and 8 is sufficiently loose so that, were it not for the improvement about to be described, the cap would be free to turn by gravity out of alinement with the screw if the screw occupied a position other than vertical. In order to hold the cap 6 in alinement with the screw, while leaving it free to adjust itself into firm clamping contact with the work, I provide a detent comprising, in this instance, a ball carried by one part of the joint and yieldingly pressed by a spring against the other part of the joint. In Fig. 2, the cap 6 is shown as provided with a recess 9 to receive an expansive spring 10 supporting a ball 11, said ball projecting into the socket 8 and into a conical recess 12 formed in the ball 7, the recess 12 being arranged axially of the screw 4.

In Fig. 3 there is shown a reversal of the detent just described, the ball 11ª and spring 10ª being carried by the ball 7ª of the universal joint and the ball being arranged to engage a tapering recess 12ª in the cap 6ª.

It will be seen that by reason of the provision of the detent between the screw and the cap, the cap will be normally held in alinement with the screw so that the workman need not pay any attention thereto. He may devote himself to arranging the thing to be clamped, supporting the body of the C clamp and operating the handle 5. There is no danger that the cap will drop down into position where the pressure of the screw will cause the cap to be forced off the end of the screw. By reason of the tapering form of the recess 12 or 12ª, the screw cap may tip slightly in any direction as clamping pressure is applied so as to adjust itself into firm contact with the part being clamped.

I claim as my invention:

A C clamp comprising a C-shaped body having a jaw, a clamping screw carried by said body in opposition to said jaw, a cap, a universal joint connection between one end of said screw and said cap, and a yieldable detent interposed between said screw and said cap for normally holding the latter in axial alinement with said screw, said detent comprising a tapered centering recess in one member of said joint, a ball carried by the other member of said joint and spring pressed against said tapered centering recess, said recess having relatively large outside limits to prevent disengagement between the ball and the recess in various angular positions of said cap.

HARRY A. RHINEVAULT.